March 4, 1930.   S. L. GOLDSBOROUGH   1,749,531
RELAY SYSTEM
Filed July 2, 1925   2 Sheets-Sheet 1
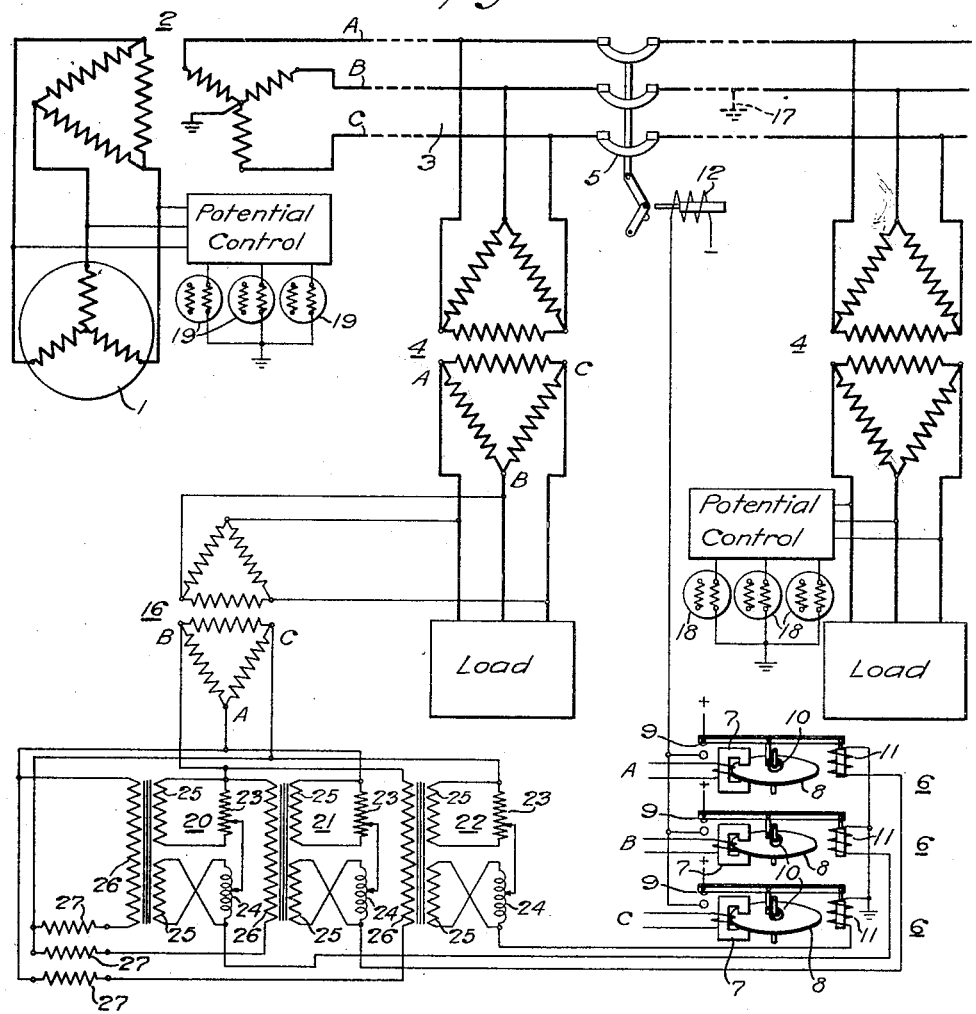
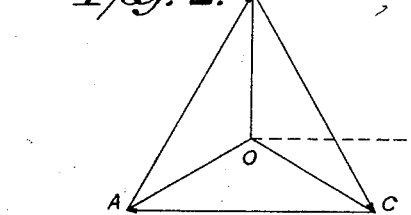
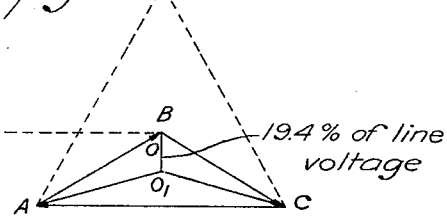
WITNESSES:
INVENTOR
Shirley L. Goldsborough.
BY
ATTORNEY

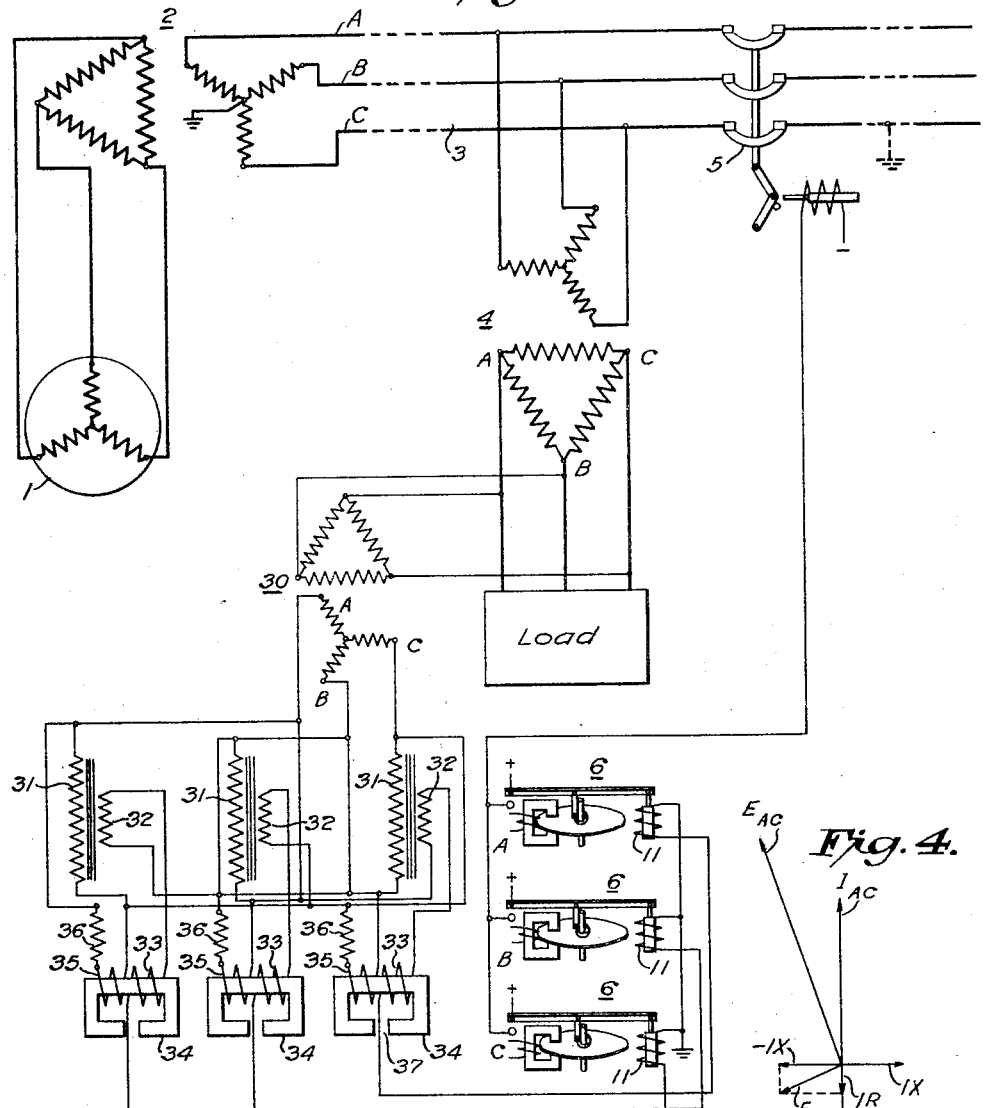

Patented Mar. 4, 1930

1,749,531

UNITED STATES PATENT OFFICE

SHIRLEY L. GOLDSBOROUGH, OF PITTSBURGH, PENNSYLVANIA, ASSIGNOR TO WESTINGHOUSE ELECTRIC & MANUFACTURING COMPANY, A CORPORATION OF PENNSYLVANIA

RELAY SYSTEM

Application filed July 2, 1925. Serial No. 41,172.

My invention relates to relay systems and particularly to relay systems for the protection of grounded high-voltage electrical distribution circuits.

One object of my invention is to provide an improved selective relay system for the protection against ground faults of a polyphase system having grounded neutral.

Another object of my invention is to provide, in a system employing a high-voltage transmission circuit to which are connected load transformers for supplying the load and relays of the impedance type for protection against faults on the transmission circuit, means whereby the relays may be connected to the low-voltage secondary windings of the load transformers and yet protect for faults on the high voltage side of the system.

A further object of my invention is to provide, in connection with a transmission circuit having a grounded neutral to which are connected ungrounded substations, means for controlling ground relays in said substations upon the occurrence of ground faults on said circuit.

In electrical distribution systems having the neutral of the generator or of the transformers at the generating station directly grounded or grounded through resistance, it is common practice to employ ungrounded transformer substations in some cases. Since these substations are distributed in their location, it is desirable to provide selective relay protection at each substation which, in the event that a fault occurs, disconnects only the faulty portion of the system and leaves the remaining substations in service.

The impedance relay, which forms the subject-matter of a copending application of L. N. Crichton, Serial No. 641,701, filed May 26, 1923, is to be preferred for this application. However, this relay comprises a current actuating winding for operating the contact members and a voltage restraining winding for determining the time of operation of the relay. In order to obtain selective operation of the relays in the system, it is necessary to energize the voltage windings thereof exactly in accordance with the voltages obtaining upon the transmission circuit. The prohibitive cost of potential transformers for the transmission voltages ordinarily used requires the connection of the voltage windings of the protective relays to the low-voltage secondary windings of the load transformers in the substations.

In case the transmission circuit becomes grounded, however, the neutral of the ungrounded substation shifts in position. Consequently, the impedance relays, if connected directly to the secondary windings of the load transformers, are incorrectly energized and selective operation is not obtained. In accordance with my invention, a corrective potential is applied to the voltage windings of the relays which corresponds to the shift in the neutral of the secondary windings, thereby overcoming the above-mentioned difficulty. In my copending application, Serial No. 41,173, filed July 2, 1925, I have disclosed and claimed a modified form of the invention in which the operation of the relay is mechanically corrected for the displacement of the neutral.

In the accompanying drawings,

Fig. 1 is a diagrammatic view of a distribution system embodying my invention;

Figs. 2 and 3 are vector diagrams illustrating the voltage relations in a portion of the circuit shown in Fig. 1 under normal conditions and under abnormal conditions, respectively;

Fig. 4 is a vector diagram illustrating the underlying principle of my invention; and Fig. 5 is a diagrammatic view of a system embodying a modified form of my invention.

Referring to Fig. 1, the electrical distribution system shown comprises a three-phase generator 1 connected through the transformer 2 to the three-phase high-voltage transmission circuit 3. The transmission circuit 3 is of considerable length and, at various points thereof, substations containing the step-down transformers 4 for supplying power to relatively low-voltage load circuits are provided.

Circuit-interrupters, such as that shown at 5, are provided at the stations of the distribution system for disconnecting sections of the transmission circuit under predetermined conditions. A plurality of protective relays 6 are provided for controlling the circuit-interrupter 5. A similar set of protective relays is provided in each substation, the connections being similar to those shown.

Each relay 6 is of the impedance type described in the above-mentioned application of L. N. Crichton and comprises a current-actuating element 7, an armature member 8 controlled thereby, and a movable contact member 9 controlled by said armature member through a coiled spring 10. A restraining solenoid 11 operates to restrain the movement of the movable contact member 9 until the torque thereof is overcome by the torque of the current element. The operation of the contact members of the relays controls the energization of the trip-coil 12 of the circuit-interrupter 5 to open the circuit upon the occurrence of a fault.

The current element 7 of each relay 6 is connected to the circuit 3 so as to be energized in accordance with the current flowing in the respective phase conductors A, B and C of the circuit. A series current transformer (not shown) in the transmission circuit 3 may be employed to energize the current element of each relay. The transmission circuit 3 is a relatively high voltage circuit but there is no difficulty in insulating current transformers for the transmission voltages in use at the present time.

However, the voltage winding 11 of the relay 6 should be energized in accordance with the voltage obtaining on said circuit and the cost of potential transformers for the transmission voltages ordinarily used is prohibitive. Consequently, I have shown the voltage windings 11 of the relays connected through a relatively low-voltage potential transformer 16 to the low-voltage secondary winding of the load transformer 4. Since the load transformer is ungrounded, however, the neutral point of the secondary circuit thereof is shifted when a ground fault occurs upon the transmission circuit 3.

If the vectors AB, BC, and CA in Fig. 2 represent the line voltages obtaining upon the transmission circuit 3 under normal conditions, in case the conductor B becomes grounded, as indicated at 17, the potential of the conductor B coincides with that of the neutral O and the position of the neutral in the secondary circuit of the transformer 4 shifts to the position $O_1$, as indicated in Fig. 3.

If the ground fault contains an appreciable resistance or a ground resistor is used in series with the neutral of the transformer 2, as may be done in some instances, the position of the neutral $O_1$ will be different from that shown but will be shifted to some extent from the normal position. Consequently, the relay 6, corresponding to the faulty conductor, if connected directly to the secondary winding of the transformer 4, would not be energized in accordance with the potential of the grounded conductor of the transmission circuit 3.

Relays 18 and 19 in the substation and generating station, respectively, are provided, the potential control of the relays 18 being similar to that of the relays 6 and the potential control of the relays 19 being similar to that disclosed in the copending application of L. N. Crichton and S. L. Goldsborough, Serial No. 49,920, filed August 13, 1925, and assigned to the Westinghouse Electric & Manufacturing Company. The relays 6, 18, and 19 have substantially equal time adjustments and, upon the occurrence of a fault in the system, operate in accordance with the distance of the fault. For example, if the ground fault is located between the two substations shown, as indicated at 17, the voltage obtaining on the faulty conductor at the substation nearest the generating station is less than that obtaining at the generating station because of the impedance drop in the circuit. Since the restraining effect of the voltage winding 11 is less than that of the voltage winding of the relay 19, in the faulty phase, the relay 6, that is connected in the faulty phase, operates first and the circuit-interrupter 5 is opened. The faulty section of the system is disconnected without disconnecting from service the transformer 4 in the substation nearest the generating station.

However, in order to obtain selective operation of the relays, it is necessary to correct the energization of the voltage windings thereof when the relays are connected, as shown, to a portion of the system having an unstable neutral. A plurality of variable impedances 20, 21, and 22, connected in series with the voltage windings 11 of the relay 6, are provided for this purpose. Each of the impedances 20, 21 and 22 comprises a variable resistor 23 and a variable reactor 24 connected respectively to the two secondary windings 25 of a current transformer, the primary winding 26 of which is connected across one of the secondary windings of the potential transformer 16.

Series resistors 27 are provided for obtaining current through said transformers of the desired magnitude and phase relation. The portions of the impedances 20, 21 and 22 in the circuit are of such character that a potential is derived that corrects the potential applied to the voltage winding 11 so that said winding is energized in accordance with the potential on the transmission circuit 3.

The primary windings 26 of the transformers for energizing the impedances are connected across the two opposite phases of the circuit. For example, the uppermost relay 6 is responsive to faults upon the conductor A, as the voltage winding thereof is connected through the impedance 21 associated with the middle transformer 26 to the conductor A of the circuit. The middle transformer 26 is connected across the phase conductors B and C of the circuit that are not affected by a fault on the phase conductor A. Consequently, the potential applied to the transformer controlling the operative relay 6 is not affected by the ground faults on the transmission circuit. Polyphase ground faults are equivalent to short-circuits and are taken care of by the usual short-circuit relay protection (not shown).

Referring to Fig. 4, the potential, $E_{ac}$ across the secondary winding of the transformer 16 has a constant value if the phase conductor B of the transmission circuit becomes grounded, as indicated. A current $I_{ac}$, lagging the voltage $E_{ac}$, traverses the primary winding 26 of the potential control apparatus. The impedances 23 and 24 are so adjusted that the vector sum of the impedance drops IX and IR thereacross provides the desired potential E for modifying the energization of the voltage windings 11 of the relays. It will be noted that the reactor 24 is reversed in order to obtain the desired phase relation of the vector E.

The magnitude and phase relation of the vector E is further changed, as desired, by varying the resistance 23 and the reactor 24. If the desired vector E is obtained, the energization of the relay 6 will correspond to that provided by the direct connection of the relay to the transmission circuit irrespective of the resistance or location of the ground fault, thus providing selective operation of the ground relays without the provision of a potential transformer insulated for the transmission voltage.

In Fig. 5, a modification of the invention is shown embodying a different form of potential control apparatus in conjunction with the relays 6. The voltage windings 11 of the relays 6 are connected, as before, through a relatively low-voltage potential transformer 30 to the low-voltage secondary winding of the transformer 4. As it is assumed that the windings of the transformer 4 are connected in star-delta relation, it is necessary to connect the windings of the transformer 30 to correspond.

A plurality of transformers 31 are connected across the secondary windings of the transformer 30 and the secondary windings 32 thereof are connected in series with the secondary windings 33 of three reactance transformers 34 and the voltage windings 11 of the relay 6. The reactance transformer 34 also comprises a primary winding 35 connected in series with a resistor 36 in shunt relation to the primary winding of the transformer 31. The transformers 31 and 35, controlling each relay 6, are connected across the unaffected phases of the transmission circuit.

The core member of the reactive transformer 34 contains an air-gap 37 so that the current traversing the secondary winding 33 of the transformer is substantially in quadrature with that traversing the primary winding 35. The current traversing the primary winding 35, on account of the resistor 36 in series therewith, is substantially in phase with the applied voltage.

The number of turns in the secondary windings 32 and 33 are so chosen that the vector sum of the potentials across said windings has such a magnitude and phase relation that the energization of the voltage windings 11 is in accordance with the potentials on the transmission circuit 3, irrespective of the impedance drop in the load transformer 4.

The magnitude of the corrective potential necessary may be readily calculated and, for a dead-grounded system, is 19.4% of the line voltage, as indicated in Fig. 3. The adjustment of the transformers 31 and 34 may be effected by means of a voltmeter connected to the circuit and, when adjusted properly, the apparatus requires no further adjustment and is correct for ground faults of any location and severity. The voltage winding 11 of each relay is connected to the phase conductors that are not affected by the single-phase fault which operates the particular relay. For example, the uppermost relay 6 is responsive to ground faults upon the conductor A and the voltage winding 11 thereof is connected through the transformers 31 and 34 to phase A, the transformers 31 and 34 controlling the relay being connected across phases B and C.

I do not consider that my invention is limited to the precise embodiments shown and described. Accordingly, I do not wish to be limited in scope except as may be indicated in the appended claims.

I claim as my invention:

1. In an electrical system comprising a polyphase transmission circuit having a grounded neutral, an ungrounded transformer connected thereto supplying a relatively low-voltage load from said transmission circuit, a relay having a current-actuating winding and a voltage-restraining winding, connections between said voltage-restraining winding and the low-voltage winding of said transformer, and a transformer having a core member of relatively high reluctance energized from the low-voltage winding of said load transformer, the secondary winding of the last-mentioned transformer being connected in series with the voltage-restraining winding of said relay.

2. In an electrical system comprising a polyphase transmission circuit having a grounded neutral, an ungrounded transformer connected thereto supplying a relatively low-voltage load from said transmission circuit, a relay having a current-actuating winding and a voltage-restraining winding, connections between said voltage-restraining winding and the low-voltage winding of said transformer, and a plurality of transformers of different phase characteristics connected in series with said voltage-restraining winding.

3. An electrical system comprising a polyphase transmission circuit having a grounded neutral, a substation, an ungrounded transformer in said substation supplying a relatively low-voltage load from said transmission circuit, a ground relay having a current actuating winding and a voltage-restraining winding, connections between said voltage-restraining winding of said relay and the low-voltage winding of said transformer and means including a transformer having a winding in series with said voltage-restraining winding of said relay for modifying the energization thereof in accordance with the displacement of the neutral of said ungrounded load transformer when a ground fault occurs upon the transmisison circuit.

4. In combination with a polyphase transmission circuit having a grounded neutral, an ungrounded transformer connected thereto for supplying a low-voltage load, and a circuit-interrupter in said circuit, of means for controlling said interrupter in accordance with the magnitude of the voltage on said circuit including a relay having a potential winding connected for energization to the low-voltage side of said ungrounded transformer, and means included in said connection for compensating for the shift of the neutral of said transformer resulting from a ground fault.

In testimony whereof, I have hereunto subscribed my name this 29th day of June, 1925.

SHIRLEY L. GOLDSBOROUGH.